March 3, 1942.  T. F. PETERSON  2,275,019
CABLE REINFORCEMENT
Filed May 14, 1936  2 Sheets-Sheet 1
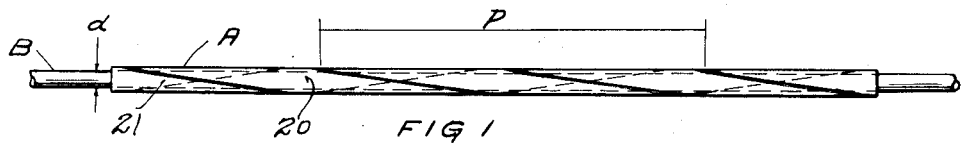
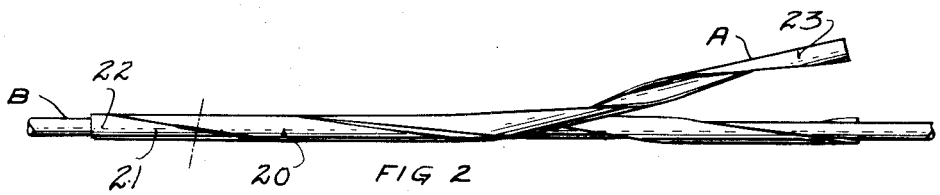
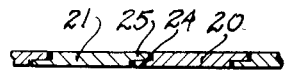 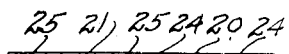 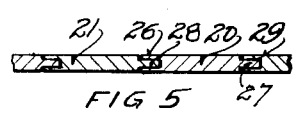
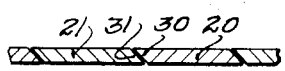 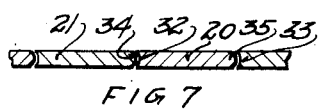
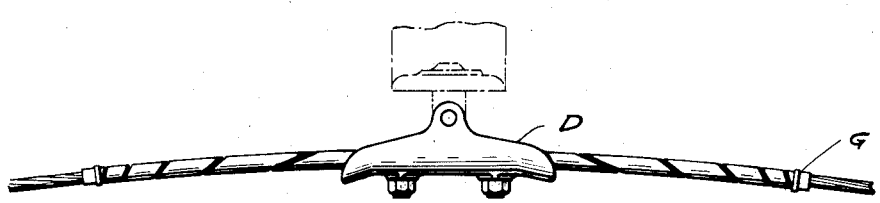
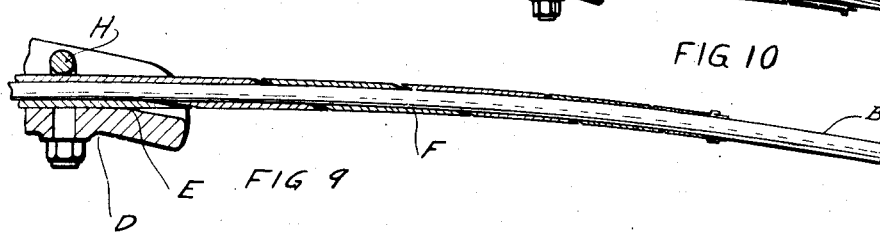
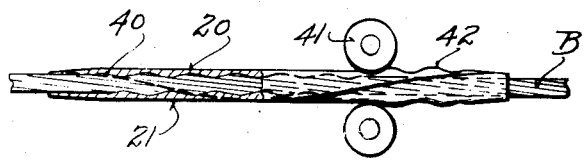
INVENTOR.
Thomas F. Peterson
BY
ATTORNEYS.

March 3, 1942. T. F. PETERSON 2,275,019
CABLE REINFORCEMENT
Filed May 14, 1936 2 Sheets-Sheet 2

INVENTOR.
Thomas F. Peterson
BY
Jno. H. Nielsen
ATTORNEYS.

Patented Mar. 3, 1942

2,275,019

UNITED STATES PATENT OFFICE 2,275,019

CABLE REINFORCEMENT

Thomas F. Peterson, Worcester, Mass.

Application May 14, 1936, Serial No. 79,689

11 Claims. (Cl. 174—42)

This invention relates to the reinforcement of cables, wires and the like, and particularly such portions of them as may be subject to mechanical vibrations, abrasion, etc.

The subjection of electric conductors to action of this kind arises, for example where the conductors carried overhead on poles pass through trees or touch other objects; where such contacts occur abrasions of the insulation take place as the conductor sways or moves. It is therefore desirable to prevent or reduce the abrasive action, and two methods are generally followed: (1) applying tough abrasion resisting coverings to the entire length of a conductor when manufactured or (2) applying protective shields at points where abrasion is anticipated after the conductor has been suspended. For the latter method the conductor ends are not generally available and longitudinal splints or split tubes, moldings and the like which require clamping to hold them together, or alternatively various forms of wrapped insulations, etc., have been proposed as shielding means.

Apart from abrasive contacts with extraneous objects, a problem arises in the suspension of overhead conductors or at the mouths of ducts, clamps, etc. that support the conductors. Bending and vibration of a conductor at such a connection result in serious trouble, particularly at the points where a support for the conductor ends abruptly in a sharp edge. Attempts have been made to reduce the destructive action by curving or beveling the ends of a supporting saddle to avoid the cutting action of abrupt edges; but this reduces the bearing surface (i. e. concentrates the bearing pressures) and serves to further localize the strains induced by a swaying or vibrating movement of the conductor.

The present invention provides a covering that can be applied to a portion of an overhead cable or the like when an end of the cable is not available, and it provides one that is readily applied from the side of the cable without requiring clamps to secure it in place about the cable. The covering furthermore provides an extended bearing surface; and it can be given a variable flexibility or stiffness to accord with the cable movement or vibration and thus avoid concentrated bearing areas while at the same time acting as a dampener of any vibrations that may be set up in the cable at suspension points.

The invention resides in a strip of insulation, metal or other suitable material preformed as an open helix. This is applied onto a conductor either by engaging the conductor with one end and rotating the strip about its own axis like a screw upon the conductor or by holding one end in place on the conductor and revolving the other end of the strip around the conductor without rotation until the strip encloses the conductor. The remaining helical gap which exposes portions of the conductor can, if found necessary or desirable, be closed in the same manner by one or more additional open helical strips, the number required for complete closing of the gap depending upon the pitch and the width of the individual strips. A complete cylindrical enclosure can thereby be obtained over any desired portion of a cable without the end of the cable being available.

A strip made as an open helix in accordance with this invention requires but limited flexibility, and the extent to which it requires bending for enclosing a conductor depends on its pitch and its width. It is only necessary that the range of bending movement or distortion necessary for its application does not stress the material beyond the elastic limit or yield point of the material used, and the stress induced can be brought within the elastic limit of most materials by giving the helix a sufficient pitch or by a sufficient width of the helical opening or gap. Materials that are relatively rigid as compared with wrappings and that permanently retain a helical formation previously imparted can therefore be used; clamps found necessary for split tubes and the like are thereby obviated.

As a suitable material from which the strip can be prepared, laminated sheet material as paper or cloth bonded with a heat-hardened phenol-aldehyde or other synthetic resin is preferred. Such a material is characterized by strength, durability and high electrical insulating properties which make it particularly desirable for covering electrical conductors where insulation is needed. It likewise has an exceptionally low coefficient of friction and any abrading action is accordingly reduced to a minimum.

The invention, however, is not restricted to insulating coverings. It also includes within its scope, coverings made in a similar manner from copper or other metal when conductivity is desired or insulation is not required.

In imparting the open helix formation, the material can first be made into a tube of proper diameter and cross-section and the tube then cut into helical strips by a saw or other means; the cylindrical tube need not be circular in cross section but can be square, hexagonal or other shape. Or strips can be individually molded or shaped into the desired helical contour. Other methods of manufacture are possible.

For a more complete understanding of the invention reference is to be had to the accompanying drawings in which—

Fig. 1 is an elevation of a conductor with a protector formed of two helical strips applied thereto;

Fig. 2 is a view similar to Fig. 1 but illustrating the second strip only partially applied;

Figs. 3 to 7 are fragmentary sections illustrating different edge formations of the strips for interlocking or engagement of the edges;

Fig. 8 is an elevation illustrating a conductor supported in a saddle and a protector of variable pitch about the conductor;

Fig. 9 is an enlarged view of a section embodying a modification obtained by gradually decreasing the thickness of a strip in the direction of the free end;

Fig. 10 is a partial longitudinal cross section showing a further strip modification obtained by an inside taper;

Fig. 11 illustrates, partly in cross section, metallic corrugated strips and in part rolled into intimate contact with a stranded cable;

Figure 12:
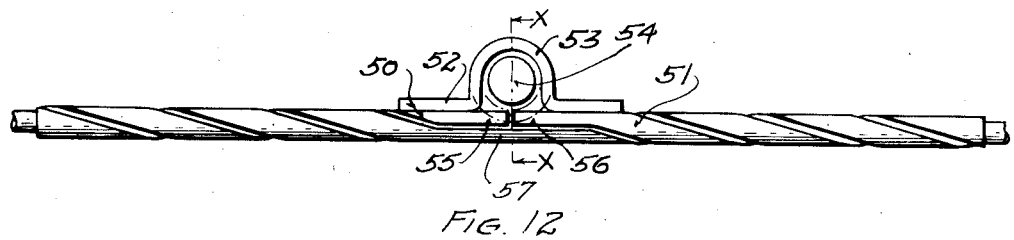
Fig. 12 illustrates another modification wherein a strip includes a clamp or fastener for securing a cable to the side of an insulator.

As shown in Fig. 1 the protector for the conductor B consists of two helical strips A of similar formation, each having a pitch $p$ equal to twice the width of a strip. The two strips 20 and 21 together form a complete cylindrical enclosure for the conductor. The application of the strips is illustrated in Fig. 2 wherein one of the strips 20, is shown as applied and the other strip 21 is shown in the action of application; the second strip, having one end 22 hooked over the conductor, is caused to enclose the conductor by revolving the other end 23 about the conductor. The helical strips preferably have an inside diameter approximating diameter $d$ of the conductor so as to closely hug the conductor.

The abutting edges of the helical strips can be given various formations as shown in Figs. 3 to 7 inclusive. In Fig. 3 the edge 24 of one strip 20 is shown as rabbeted to receive a complementary rabbeted edge 25 on the other strip 21; both strips 20 and 21 are similarly shaped. Fig. 4 likewise shows rabbeted edges, but with the modification that the rabbeted edges 24 are on one side of the strip 20 and rabbeted edges 25 are on the opposite side of the strip 21; accordingly the edges 25 of the helical strip 21 can be applied over the edges 24 of the strip 20. In Fig. 5 the strip 20 is provided with a groove 26 on one edge and a tongue 27 on the other edge to cooperate with a tongue 28 and groove 29 on the edges of the strip 21. Fig. 6 illustrates the strips provided with complementary beveled edges 30 and 31. In Fig. 7 the strips are provided with concave edges 32, 33 cooperating with convex edges 34, 35.

As heretofore stated the invention lends itself particularly to the use of materials that are too stiff to be applied like a tape of wrapping. Where insulation is also desirable, a material such as a synthetic resin-bonded laminated cloth or paper structure characterized by high dielectric and mechanical strength, inertness to atmospheric conditions, etc. is preferred. Such laminated insulation can be preformed as a tube closely conforming to the diameter of a conductor and to its cross-section, whether circular, square, polygonal or of any other cross-section; when preformed into a tube, the tube is then cut into helical strips as described. The helical strips also can be preformed individually from resin-impregnated strips of cloth or paper and wrapped to the desired pitch and thickness on a mandrel and then hardened to shape by heating. Where the required mechanical strength and the shape of the strip permit, it is also possible to hot-mold a strip from a powdered molding composition, particularly by forcing or extruding the composition into a mold of the proper configuration. Various other methods of manufacture are possible, and other materials in place of heat-hardening resinous compositions can be substituted; for example vulcanized rubber, or laminated paper or cloth structures bonded by other cementing materials, as casein, blood, glue, etc. can be used. While the preformed strips preferably have an approximately trapezoidal cross-section (as shown in the cross section of a strip in Fig. 16) such as to form a tube when a sufficient number are applied to fully enclose the conductor, they can have other cross sections as the circular.

In Figs. 8, 9 and 10 there are illustrated embodiments of the invention wherein the protector or reinforcement is associated with a suspension means or clamp D; a clip G secures the ends of the strips and can also function to bind the reinforcement to the conductor and prevent a sliding movement. The reinforcement can be one continuous piece from end to end or be made in sections with each section secured to the clamp as by a U-bolt H (Fig. 9). As shown in Fig. 8 the reinforcement is made up of helices of varying pitch, the pitch being reduced or decreased toward the free ends (i. e. ends remote from the clamp) but the thickness of each strip remains the same; this gives a maximum of stiffness with no appreciable bending at the clamp, but the stiffness decreases toward the ends. By this construction the reinforcement can be given a flexibility to permit it to conform itself to the curvature taken by the conductor. Increased flexibility toward the ends can also be had by diminishing the thickness of the strips instead of changing the pitch or by combining both as shown in Fig. 9. In Fig. 10 the strips are provided with an inside taper, thus diminishing the thickness of the strips but supplying a gradually increasing diameter to permit some play of the conductor toward the ends of the reinforcement. These different forms give an extended bearing surface which flexes with the conductor and at the same time absorbs vibrations in the conductor.

In the foregoing embodiments illustrated in Figs. 8 to 10 the helical strips act as reinforcements to the cable to strengthen it and as a dampening means for vibrations occurring in the conductor or cable. In addition they provide an extended bearing surface; and by lessening their stiffness toward the ends so as to conform themselves to the curve assumed by the cable, there is no substantial localization or concentrations of areas for breaking or weakening the cable due to swaying or vibrating.

In acting as reinforcements for a suspended base conductor, the strips can be made of the same material as the conductor, for example, copper, aluminum, etc. They are sprung or threaded into place as heretofore described.

Another application of the invention is illustrated in Fig. 11. It frequently happens that one or more strands of a conductor break, thus weakening the conductor. When this occurs helical metal strips 20, 21 are placed about the weakened section of the cable B. These strips can be given a corrugated interior surface as at 40 to conform to the lay of the strands and forced into close contact by rollers 41; or they can be given a corrugated external surface 42, and then forced by means of the rollers between the strands and given a smooth outer surface. By this means the strips are firmly locked into the conductor to strengthen and support it.

Figure 13:
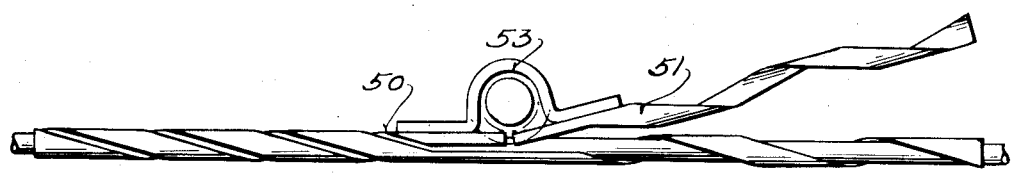
Fig. 13 is the same as Fig. 12 but illustrating the application of a strip for securing it to an insulator.

In the suspension of transmission lines they are generally supported by insulators of glass or porcelain and are secured to these insulators by wire wrappings. In Figs. 12 to 16 inclusive there are illustrated modified embodiments of the invention whereby the transmission lines are not only reinforced and protected against breaking at the insulators by the helical strips but they are also secured to the insulators by means of the strips. This is accomplished according to the form illustrated in Fig. 12 by forming one of the strips into sections 50 and 51 and welding or otherwise securing to the sections a clamping member 52. The clamping member is provided with a U-shaped portion 53 for encircling an insulator 54. In order to provide adequate surface to the strip sections 50 and 51 for securing the clamping member, the strip ends 55 and 56 are extended axially. In conformity the cooperating strip is likewise provided with an axially extending portion 57. The application of the reinforcement to the transmission line so as to secure it to the insulator is illustrated in Fig. 13; a strip section 50 is sprung into place about the conductor, the yoke portion 53 of the clamping member is snapped over the insulator, and the remaining section 51 of the strip is then put in place.

Figures 14, 15, 16:
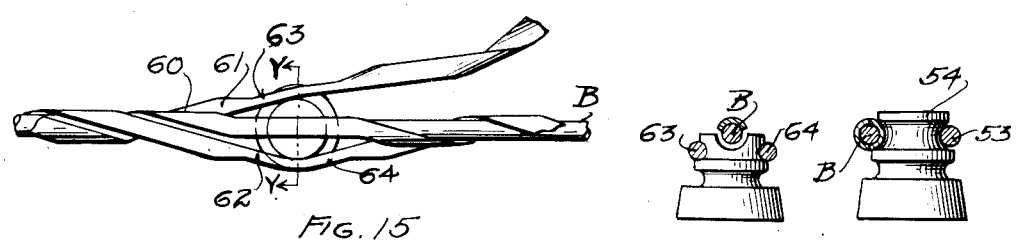
Fig. 14 is a section on the line x—x of Fig. 12.
Fig. 15 is a modification similar to Fig. 12 but illustrating in top view a conductor secured on the center of an insulator by a three-strip protector.
Fig. 16 is a section on the line y—y of Fig. 15.

A somewhat modified means for securing the transmission line to an insulator is shown in Figs. 15 and 16; this modification applies where the conductor is supported on the middle of the insulator. In this case a reinforcement of three helical strips is preferably provided. One of these strips 60 overlies the conductor, while the other strips 61 and 62 engage the sides of the insulator to grip the latter. To assist in the gripping action the contacting portions 63 and 64 of the strips 61 and 62 can be made circular in cross-section. Fig. 15 illustrates also the application of the strips to the conductor and the insulator.

Figure 17:
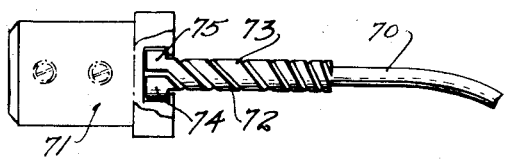
Fig. 17 shows the application of a protector to a heater cord plug.

The extent to which the invention can be applied is further shown in the embodiment of Fig. 17. In this case the strips act as reinforcements for a cord 70 secured to a heater plug 71. The strips 72 and 73 are given a spring-like double pitch winding and are provided with enlarged ends 74 and 75 to be locked in the plug. By the use of these strips it is not necessary to detach the cord from the plug for their application or removal.

While the foregoing embodiments of the invention are directed to the reinforcement of electric conductors as illustrations, the invention finds application to other forms of cable, wires and the like, both stranded and solid, that are used for other purposes; the term "cable" is used as inclusive of these various forms. Accordingly it is to be understood that the invention is not restricted to the specific embodiments disclosed and that it is to be given a scope commensurate with the appended claims.

What is claimed is:

1. Reinforcement for a cable comprising an element preformed as an open helix having a pitch and opening between turns to permit application to the cable from its side, the material of said element being insulation including a synthetic resin and sufficiently rigid to retain its original preform during and after application to the cable.

2. The combination with a line conductor adapted to be supported at spaced points therealong, of means for increasing the rigidity of said conductor for a short distance therealong at said points, said means comprising a preformed open helix of hard-drawn wire and capable of substantial elastic deformation manually, whereby it may be laid sidewise against said conductor and wrapped therearound without permanent deformation of the helix, the inside diameter of the helix being substantially equal to the outside diameter of the conductor, whereby the helix when so applied to the conductor has a tight frictional grip thereon at all points along the helix.

3. The combination with a line conductor adapted to be supported at spaced points therealong, of means for increasing the rigidity of said conductor for a short distance therealong at said points, said means comprising a preformed helix having a pitch several times its diameter and capable of substantial elastic deformation manually, whereby it may be laid sidewise against said conductor and wrapped therearound without permanent deformation of the helix, the inside diameter of the helix being substantially equal to the outside diameter of the conductor, whereby the helix when so applied to the conductor has a tight frictional grip thereon at all points along the helix.

4. The combination with a line conductor adapted to be supported at spaced points therealong, of means for increasing the rigidity of said conductor for a short distance therealong at said points, said means comprising a preformed helix having a pitch several times its diameter and capable of substantial elastic deformation manually, whereby it may be laid sidewise against said conductor and wrapped therearound without permanent deformation of the helix, the inside diameter of the helix being substantially equal to the outside diameter of the conductor, whereby the helix when so applied to the conductor has a tight frictional grip thereon at all points along the helix, said helix being long enough to extend along said conductor for at least several turns of the helix in opposite directions from a point of support.

5. The combination with a line conductor adapted to be supported at spaced points therealong, of means for increasing the rigidity of said conductor for a short distance therealong at said points, said means comprising a preformed helix having a pitch several times its diameter and capable of substantial elastic deformation manually, whereby it may be laid sidewise against said conductor and wrapped therearound without permanent deformation of the helix, the inside diameter of the helix being no greater than the outside diameter of the conductor, whereby the helix when so applied to the conductor has a tight frictional grip thereon at all points along the helix.

6. The combination defined by claim 3 characterized by the helix having a relatively straight portion integral therewith.

7. The combination defined by claim 3 characterized by said helix having a straight portion at an end.

8. The combination defined by claim 3 characterized by said helix having a straight intermediate portion.

9. The combination with a main support and a wire mounted thereon, of an attachment bridging the support and engaging the wire at opposite sides thereof, said attachment comprising a helical member surrounding the wire and of gradually increased flexibility from the support to the ends of the attachment, said wire constituting the sole means for holding the attachment assembled with the support.

10. The combination with a main support and a wire mounted thereon, of an attachment bridging the support and engaging the wire at opposite sides thereof, said attachment comprising a helical member surrounding the wire and of gradually increased flexibility from the support to the ends of the attachment, said wire constituting the sole means for holding the attachment assembled with the support, the convolutions of the attachment being decreased gradually in pitch toward the ends of the attachment.

11. The combination with a main support and a wire mounted thereon, of an attachment bridging the support and engaging the wire at opposite sides thereof, said attachment comprising a helical member surrounding the wire and of gradually increased flexibility from the support to the ends of the attachment, said wire constituting the sole means for holding the attachment assembled with the support, the said helical member consisting of a rod tapered toward both ends from the center.

THOMAS F. PETERSON.